US 6,876,957 B1

(12) United States Patent
Stewart

(10) Patent No.: US 6,876,957 B1
(45) Date of Patent: Apr. 5, 2005

(54) ELECTRONIC EQUIPMENT SIMULATED EARTHQUAKE SURVIVABILITY TEST SYSTEM AND METHOD

(75) Inventor: Thomas Stewart, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 755 days.

(21) Appl. No.: 09/752,505

(22) Filed: Dec. 27, 2000

(51) Int. Cl.[7] .............................................. G06G 7/48
(52) U.S. Cl. .................... 703/6; 703/1; 703/2; 702/42; 702/56
(58) Field of Search ...................... 703/1–2, 6; 702/42, 702/56

(56) References Cited

U.S. PATENT DOCUMENTS

| 5,388,056 A | * | 2/1995 | Horiuchi et al. | 702/56 |
| 5,602,757 A | * | 2/1997 | Haseley et al. | 702/56 |
| 5,602,759 A | * | 2/1997 | Harashima et al. | 702/56 |
| 6,341,258 B1 | * | 1/2002 | Inoue et al. | 702/56 |
| 6,397,153 B1 | * | 5/2002 | Yamagishi et al. | 702/42 |

OTHER PUBLICATIONS

Wong et al, "Durability/Reliability of BGA Solder Joints Under Vibration Environment", IEEE Proceedings of the 50th Electronic Components and Technology Conference, pp. 1083–1088 (May 2000).*

Tellcordia GR–63–CORE Issue Oct. 1, 1995 Network Equipment–Building System (NEBS) Physical Protection Environmental Criteria.

* cited by examiner

Primary Examiner—Samuel Broda

(57) ABSTRACT

The present invention is a transient vibration time history testing calibration system and method that assists testing equipment reproduce predefined earthquake synthesized waveforms within acceptable parameters. Adjustments are made to forces applied to the equipment under test (EUT) so that the acceleration of the EUT corresponds to a predetermined acceleration time history waveform. Information associated with the acceleration time history waveform is loaded in a controller which produces shaker drive signals that control movements of a shaker. Two waveform tests are run at an attenuated value (e.g., −3 dB) of a full level test on a dummy load. The acceleration of the dummy load is measured and adjustments are made to update the drive signals if the TRS is not within acceptable tolerances of the RRS. The adjustments are projected to provide shaker drive signals that shake the EUT within acceptable ranges of a RRS. Then a waveform test is run at full strength with the dummy load and the dummy load movements are measured. If the projected TRS for the equipment under test is not within acceptable tolerances of the RRS further adjustments calculated to bring the TRS within acceptable range of the RRS are made to the shaker drive signals. A waveform test is then performed on the EUT at an attenuated value and if the TRS is not projected to be within acceptable tolerances of an RRS for a full strength test, more adjustments are made to the shaker drive signals.

22 Claims, 15 Drawing Sheets

Earthquake Synthesized Waveform- VERTEQII

| Coordinate Point | Frequency (Hz) | Values for Upper Floor Acceleration (g) |
|---|---|---|
| Zones 1 and 2 | | |
| 1 | 0.3 | 0.2 |
| 2 | 0.6 | 2.0 |
| 11 | 5.0 | 2.0 |
| 12 | 15.0 | 0.6 |
| 13 | 50.0 | 0.6 |
| Zone 3 | | |
| 1 | 0.3 | 0.2 |
| 2 | 0.6 | 2.0 |
| 7 | 1.0 | 3.0 |
| 8 | 5.0 | 3.0 |
| 9 | 15.0 | 1.0 |
| 10 | 50.0 | 1.0 |
| Zone 4 | | |
| 1 | 0.3 | 0.2 |
| 2 | 0.6 | 2.0 |
| 3 | 2.0 | 5.0 |
| 4 | 5.0 | 5.0 |
| 5 | 15.0 | 1.6 |
| 6 | 50.0 | 1.6 |

321

322
Shake a dummy load at a first attenuated value of the preliminary shaker instructions.

323
Measure the actual acceleration time history movement of the dummy load when shook at the attenuated value of the preliminary shaker instructions.

324
Analyze if a dummy load attenuated test response spectrum (TRS) is projected to be within acceptable range of a required response spectrum (RRS) requirements.

325
Make adjustments in the preliminary shaker instructions to produce the dummy load initial calibrated shaker instructions, the adjustments calculated to bring a dummy load full strength test response spectrum within acceptable range of the required response spectrum (RRS)

332
Shake a dummy load at full strength value of the dummy load initial calibrated shaker instructions.

333
Measure the actual acceleration time history movement of the dummy load when shook at the full strength value of the dummy load initial calibrated shaker instructions.

334
Determine if the dummy load full strength test response spectrum (TRS) is within an acceptable range of the required response spectrum (RRS).

335
Make adjustments in the dummy load initial calibrated shaker instructions to produce the dummy load final calibrated shaker instructions, the adjustments calculated to bring a test response spectrum (TRS) within an acceptable range of the required response spectrum (RRS).

352
Shake equipment under test at a full strength value of the equipment under test final calibrated shaker instructions.

353
Measure the actual acceleration time history movement of the equipment under test when shook at the full strength value of the predetermined waveform.

354
Determine if the test response spectrum (TRS) is within acceptable range of the required response spectrum (RRS).

FIG. 3E

| Test Parameter | Performance Criteria | Test Tolerance |
|---|---|---|
| VERTEQII waveform | TRS shall meet or exceed RRS | TRS less than 30% over RRS from 1 to 7 Hz |
| Acceleration | Synthesized waveform 1.6 G's peak for 30 seconds | Not Applicable |
| Data sample rate | 200 Hz | Not Applicable |
| Test frame system weight | 435 lbs (approximately) | +/- 5% |
| Load-cell torque | Up to 65 ft-lbs | +/- 1 ft-lb |
| Displacement (rack top) | 76.2 mm maximum | +/- 5 mm |

FIG. 7

| Test Parameter | Performance Criteria | Test Tolerance |
|---|---|---|
| Frequency Range | 1 to 50 Hz | Not Applicable |
| Sweep Rate | 1.0 octave/minute | Not Applicable |
| Acceleration | 0.2 G's | +/- 0.02 G's |
| Data sample rate | 200 Hz | Not Applicable |
| Test frame system weight | 435 lbs (approximately) | +/- 5% |

FIG. 9

| Model # | Code Name | Business Unit | BU Contact |
|---|---|---|---|
| : | : | : | : |
| -------- | Vertical | Front-to-Back | Side-to-Side |
| Date | | | |
| Time | | | |
| Test Engineer or Technician | | | |
| Frame Top Resonant Frequency (Hz) | | | |
| EUT Resonant Frequency (Hz) | | | |
| Peak Acceleration Response at the top of the Frame (G) | | | |
| Displacement (inches or mm) | | | |
| Door, Covers, Panels | | | |
| Cracks, Buckles, Visual inspection | | | |
| Bolt or Anchor Torque values (ft-lb)(4) | | | |
| Load Cell Values (lb, all 4) | | | |
| LED Status during the Test | | | |
| Diagnostic or software function during the Test | | | |
| Comments | | | |

FIG. 10

ELECTRONIC EQUIPMENT SIMULATED EARTHQUAKE SURVIVABILITY TEST SYSTEM AND METHOD

FIELD OF THE INVENTION

The present invention relates to the field of electrical equipment earthquake survivability testing. More particularly, the present invention relates to a system and method for calibrating testing equipment to accurately reproduce simulated seismic forces represented by acceleration time history waveforms within specified parameters.

BACKGROUND OF THE INVENTION

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These electronic devices are often operated in geographical areas in which catastrophic natural events such as earthquakes occur. Designing electronic equipment with a reasonable level of operational survivability during an earthquake is often very important. For example, a variety of electronic devices are utilized to provide critical emergency services during natural disasters. To be effective the devices typically must remain operational during and after a natural catastrophe. However, accurately testing electrical equipment to ensure it meets earthquake survivability requirements is usually very difficult and often results in undue damage to the equipment being tested.

Communications networking equipment is one example of electronic devices that should have a relatively high degree of earthquake survivability factored into the design. The ability to communicate quickly and reliably in an emergency situation such as an earthquake is vital to many health and safety services. Typically the public communicates with health and safety services by telephone and telephone systems usually rely upon communications networking equipment (e.g., routers) to provide switching and routing of the telephone calls. If the communications networking equipment is not built with enough robustness to operate after an earthquake it becomes very difficult for people to communicate with health and safety services.

The ability of communications network equipment to operate properly after an earthquake is usually dependent upon its ability to withstand forces generated by seismic disturbances. Seismic disturbances usually result in the application of forces that cause the networking equipment to accelerate and move in vertical and horizontal directions. Extreme acceleration changes of the equipment in different directions can cause damage such as connections coming loose, components shaking loose or falling off of equipment framework and buckling, damage or permanent deformation in the framework.

Traditional earthquake survivability testing involves the application of simulated seismic forces to the electronic equipment in accordance with predetermined acceleration time history waveforms. It is important for simulated earthquake tests to be consistent, accurate, repeatable, and applicable to the end-use environment. In order to promote these objectives government and industry organizations have promulgated certain testing standards such as Telcordia (Bellcore) GR-63 criteria. Telcordia (Bellcore) GR-63 specifies Network Equipment-Building System (NEBS) requirements for physical protections in a variety of environmental situations including seismic events.

The Telcordia (Bellcore) GR-63 criteria set forth earthquake survivability testing objectives and requirements. The NEBS requirements indicate that shaking should be applied to the equipment under test (EUT) in each of three orthogonal directions of the EUT. The test requirements indicate the EUT should be subjected to forces that move the EUT in accordance with a synthesized waveform (e.g., acceleration-time history waveform VERTEQII shown in FIG. 1A) by means of a shaker table. Traditional testing systems and methods typically attempt to shake the EUT in accordance with the prescribed motion represented by the synthesized waveform but usually require significant calibration efforts and often not successful at meeting the NEBS requirements.

The Telcordia (Bellcore) GR-63 criteria require the test response spectrum (TRS) for the EUT to be measured and recorded when the EUT is shook. The test response spectrum (TRS) is the shaker table's analyzed acceleration (e.g., in the fast fourier transform (FFT) domain) when reproducing a waveform (e.g., the Bellcore waveform). The NEBS requirements indicate the TRS needs to meet or exceed the required response spectrum (RRS) show in FIG. 1B for the applicable earthquake risk zone in the range from 1.0 to 50 HZ. The NEBS requirements also indicate the TRS is to be calculated using a damping level of 2%.

Most transient vibration testing standards such as the NEBS requirements indicate that the EUT shall be constructed to sustain the waveform testing at prescribed parameters without permanent structural, mechanical or functional damage. NEBS requirements indicate permanent physical damage is defined as deformation of a load bearing element of the equipment being tested (e.g., buckled uprights, deformed bases, cracks and failed anchors or fastening hardware) or a connection failure. Mechanical damage is a dislocation or separation of components (e.g., disengaged circuit cards or modules, opened doors or covers, etc.). The functionality requirements are usually dependent upon the service provided by the equipment and NEBS requirements indicate the EUT shall be constructed to sustain operation without loss of service, replacement of components, manual rebooting, or human intervention immediately before and after each axis of waveform testing.

Meeting earthquake survivability requirements for network telecommunications equipment is usually very difficult and consumes significant resources. Traditional attempts at seismic testing often result in inaccurate results and unnecessary destruction of expensive equipment. For example, traditional testing approaches usually require significant detrimental shaking when calibrating testing equipment after the EUT is placed on a shaker. Calibration is usually required to account for each shaker table's unique response to the dynamic acceleration impacts of the EUT on the shaker table when attempting to reproduce the desired seismic waveform. If the TRS is below the RRS at any point the NEBS standards require the equipment to be retested.

Repetitive shaking associated with calibration and retesting due to failed attempts at meeting the NEBS desired seismic waveform requirements expose the EUT to seismic forces that progressively weaken or otherwise diminish the survivability of the EUT. For example, if the EUT is repetitively subjected to acceleration forces, connections are often gradually shook loose that may have otherwise withstood a shaking in accordance with test requirements (e.g., NEBS requirements) if the simulation forces had been properly applied during an initial attempt (e.g., a TRS is within specified parameters of the RRS). In addition, framework features may become unduly fatigued during repetitive attempts and fail during the final test when they otherwise would not have failed if the initial test was within acceptable parameters.

Another factor affecting the survivability design of the EUT is significantly exceeding acceptable minimum test requirements. There is usually a significant range of acceptable testing results such as withstanding forces greater than some minimum value within a specified percentage (e.g., acceleration forces 30% greater than a RRS). Typically, significant resources are required to design and manufacture electronic equipment that withstands relatively large transient vibration (e.g., seismic) forces. Electronic equipment designed to withstand transient vibrations that exceed an RRS by only a few percentage points (e.g., 3%) typically require less resources to manufacture than electronic equipment that is designed to withstand transient vibrations that exceed an RRS by a significant percentage (e.g., 30%). However, electronic equipment that passes NEBS requirements at values 3% greater than the required accelerations (e.g., test waveform shown in FIG. 1) may fail at values 30% greater. Thus, NEBS requirements may permit application of acceleration forces that exceed minimum requirements by a significant percentage but equipment designed and manufactured to withstand application of such acceleration forces usually requires significant additional resources. Thus, it is often advantageous to have TRS results that are within a few percentage points of the RRS instead of 30% greater. While the Telcordia (Bellcore) GR-63 criteria sets requirements for electronic equipment to satisfy it does not set forth the procedures for testing the equipment without undue testing or commitment of resources.

What is required is a system and method that facilitates earthquake testing adjustments directed at assisting consistent, accurate, and efficient earthquake survivability testing for communications networking equipment with minimal calibration shaking.

SUMMARY

The present invention is a system and method that facilitates earthquake testing adjustments directed at assisting consistent, accurate, and efficient earthquake survivability testing for communications networking equipment with minimal calibration shaking. The present invention transient vibration time history testing calibration system and method facilitates efficient and effective calibration of vibration simulation systems to accurately reproduce predefined conditions during electronic equipment vibration survivability testing. The transient vibration time history testing calibration system and method provides shaking force adjustments that produce equipment under test (EUT) accelerations tightly corresponding to a predefined waveform without the application of undue vibration to the EUT. The transient vibration time history testing calibration method facilitates reduction of equipment destruction and over-design of equipment associated with false testing failures corresponding to excessive vibrations beyond prescribed parameters.

In one embodiment of the present invention, the transient vibration time history testing calibration system and method is utilized to facilitate adjustments that ensure predefined earthquake synthesized waveforms are reproduced within acceptable parameters by earthquake survivability testing equipment. In one exemplary implementation of the present invention, adjustments are made to forces applied to the EUT so that the acceleration of the EUT corresponds to a predetermined acceleration time history waveform. In one embodiment of the present invention, information associated with an acceleration time-history waveform is loaded in a controller which produces shaker drive signals that control movements of a shaker. Two waveform tests are run at an attenuated value (e.g., −3 dB) of the shaker drive signals on a dummy load with a similar mass and configuration to the EUT. The acceleration of the dummy load is measured and adjustments are made to update the drive signals if the projected TRS for the EUT is not within acceptable tolerances of the RRS associated with the predetermined acceleration time history waveform. The adjustments are projected to provide shaker drive signals that shake the EUT within acceptable ranges of a RRS. Then a waveform test is run at full strength with the dummy load and the dummy load movements are measured. If the projected TRS for the equipment under test is not within acceptable tolerances of the RRS (e.g., the TRS is above the RRS for frequencies at or above 1 Hz and no values are more that 30% above prescribed RRS values between 1 and 7 Hz) further adjustments calculated to bring the TRS within acceptable range of the RRS are made to the shaker drive signals. A waveform test is then performed on the EUT at an attenuated value and if the TRS is not projected to be within acceptable tolerances of an RRS for a full strength test, more adjustments are made to the shaker drive signals.

DESCRIPTION OF THE DRAWINGS

FIG. 3B is a flow chart of one embodiment of a dummy load attenuated shaking process utilized in a present invention transient vibration time history testing calibration method.

FIG. 3C is a flow chart of one embodiment of a dummy load full strength shaking process utilized in a present invention transient vibration time history testing calibration method.

FIG. 3E is a flow chart of one embodiment of an equipment under test full strength shaking process utilized in a present invention transient vibration time history testing calibration method 300.

FIG. 7 is a table of the earthquake test parameters utilized in one exemplary implementation of the present invention.

FIG. 9 is a table showing testing objectives in one embodiment of the present invention.

FIG. 10 shows one embodiment of a Earthquake Test Data Sheet included in one embodiment of the present invention.

DETAILED DESCRIPTION

Reference will now be made in detail to the preferred embodiments of the invention, a transient vibration time history testing calibration system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention transient vibration time-history testing calibration system and method facilitates adjustments that ensure predefined acceleration time history waveforms are reproduced within acceptable parameters by vibration testing equipment. In one embodiment, the present invention provides an efficient and effective method for calibrating testing equipment to perform in accordance with standard requirements such as conforming to Telcordia (Bellcore) GR-63 criteria. For example, the calibration methods and procedures of the present invention are directed at ensuring testing equipment performs in accordance with the GR-63-CORE Issue 1, October 1995 requirements R4-44, R4-45, R4-46, 04-47, R4-48, R4-49 without undue stress and over testing of the EUT. In one exemplary implementation of the present invention, a transient vibration time history testing calibration system and method comprises a computer system controlling an earthquake simulation shaker device in accordance with adjustments to a shaker drive signal based upon analysis of measurements from forces applied to dummy loads and attenuated shaking runs with the EUT.

Figure 1A:
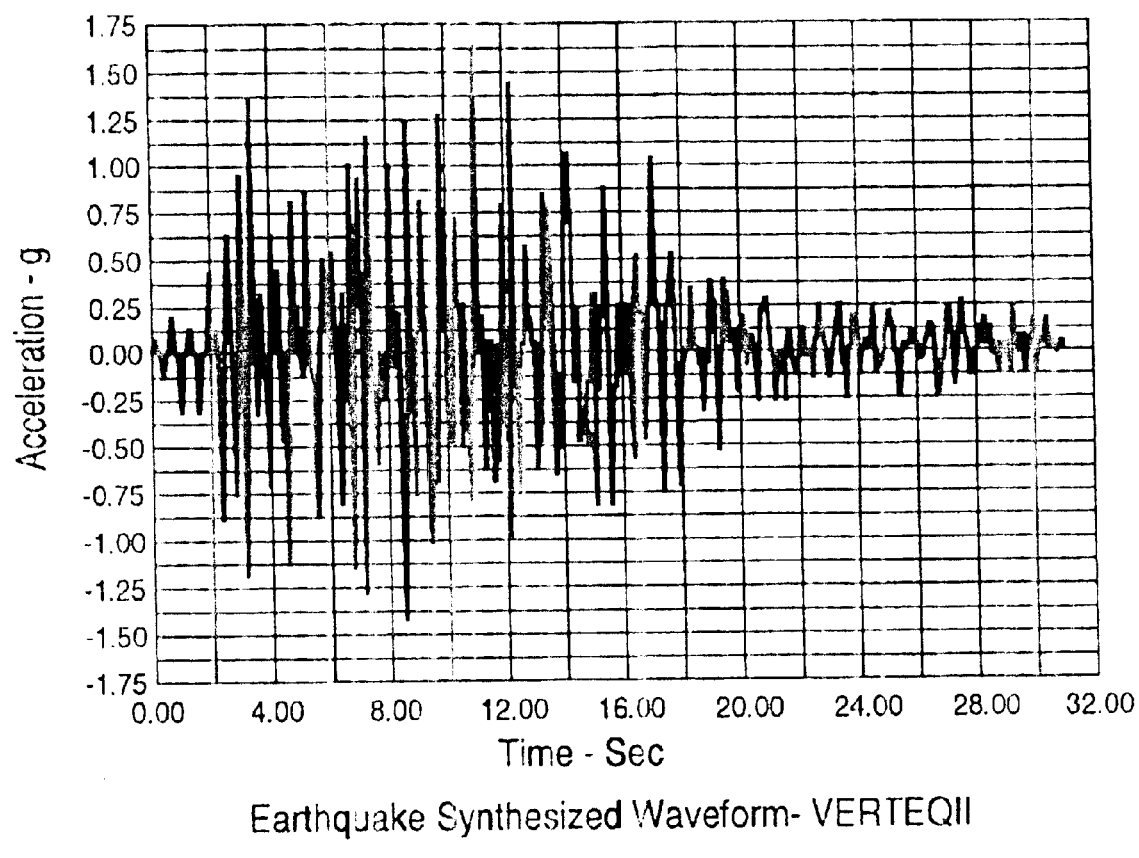
FIG. 1A is an illustration of a acceleration-time history waveform VERTEQII.
Figure 1B:
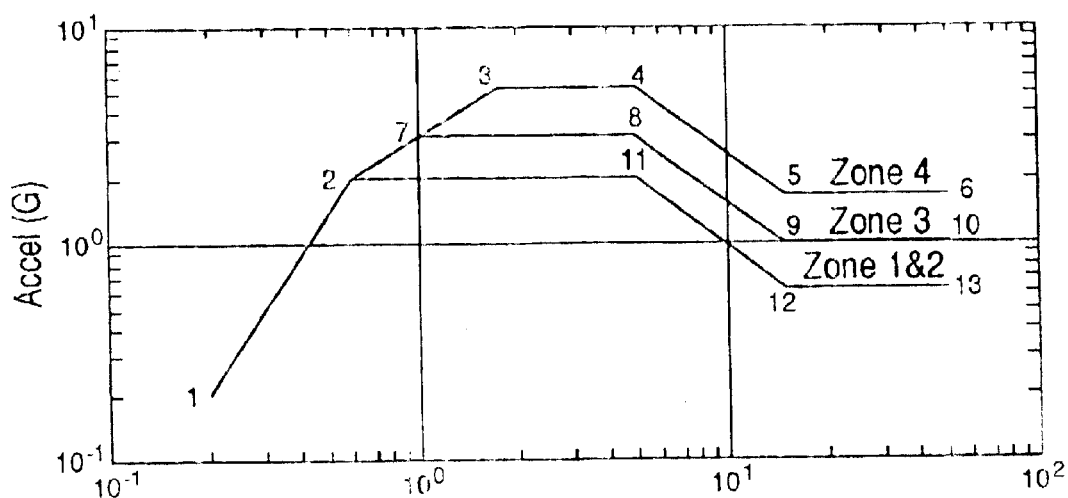
FIG. 1B is a graph and table of one embodiment of a required response spectrum (RRS).
Figure 2:
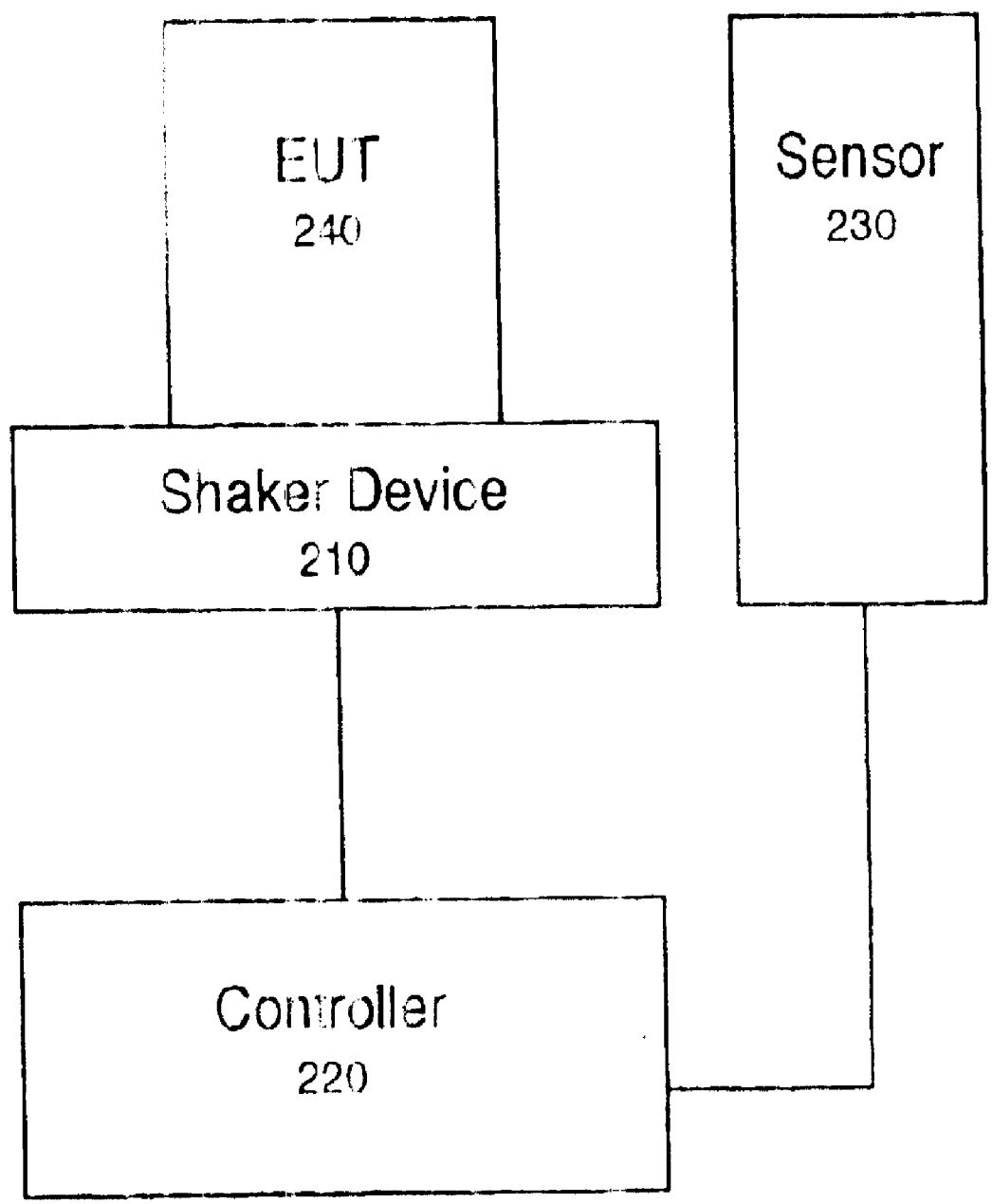
FIG. 2 is a block diagram of a seismic force testing system, one embodiment of the present invention.

FIG. 2 is a block diagram of seismic force testing system 200, one embodiment of the present invention. Seismic force testing system 200 comprises a shaker 210, test controller 220 and a sensor 230. Shaker 210 is coupled to test controller 220 which is coupled to sensor 230. Shaker 210 applies forces that accelerate equipment under test (EUT) 240 in different (e.g., horizontal and vertical) directions thereby providing simulation of an earthquake event. In one exemplary implementation of the present invention, shaker 210 applies forces that accelerate the EUT in accordance with a predetermined acceleration pattern. Test controller 220 utilizes shaker instructions to generate shaker drive signals that control a shaker mechanism within shaker 210. The shaker instructions provide information to shaker 210 on the level of force and frequency of shaking motion. Sensor 230 senses movements in EUT 240. In one exemplary implementation of the present invention, controller 220 directs shaker 210 to shake EUT 240 in accordance with acceleration-time history waveform VERTEQII shown in FIG. 1A.

In one embodiment of the present invention, shaker 210 complies with GR-63-CORE requirements. For example, shaker 210 has a usable peak-to peak stroke minimum of 10 inches (250 mm), a minimum frequency range of 1.0 to 100 Hz, and a peak sinusoidal velocity of 40 in/sec (lm/sec). In one exemplary implementation of the present invention there are three accelerometers each with a minimum dynamic range of 0.5 to 100 Hz. The TRS is generated from the shaker table acceleration data via a response spectrum analyzer, using 2% damping and the reproduction of the Bellcore waveforms is verified by analyzing the TRS at 6th octave (logarithmically spaced) frequencies from 0.5 to 50 HZ.

Figure 3A:
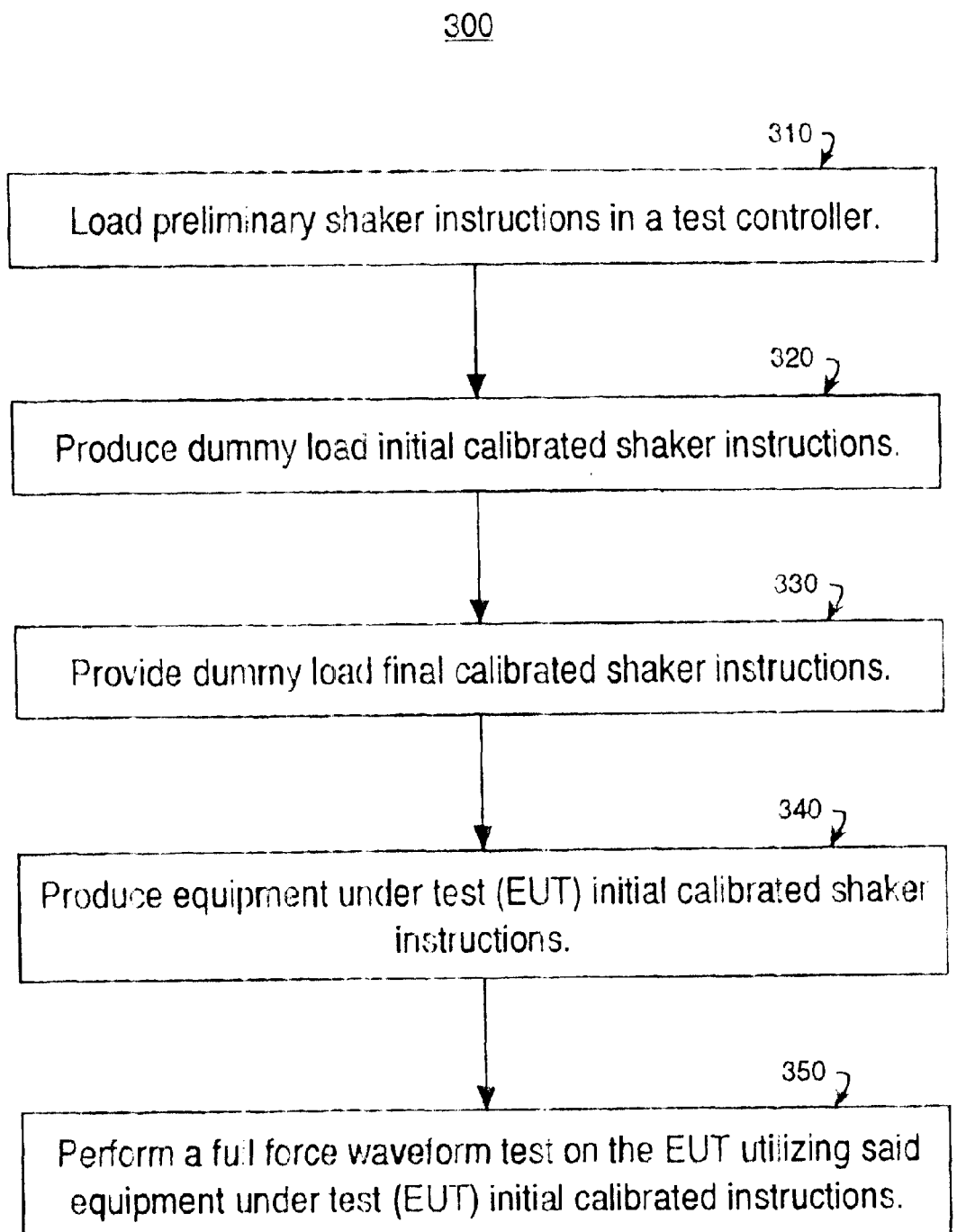
FIG. 3A is a flow chart of a transient vibration time history testing calibration method, one embodiment of the present invention.

FIG. 3A is a flow chart of transient vibration time history testing calibration method 300, one embodiment of the present invention. Transient vibration time history testing calibration method 300 facilitates adjustments to shaker drive instructions that assist earthquake survivability testing equipment to accurately reproduce predefined synthesized earthquake waveforms within acceptable parameters. Transient vibration time history testing calibration method 300 assists the earthquake survivability testing equipment to provide results that tightly trace a predefined waveform without the application of undue vibration to the EUT. Thus, transient vibration time history testing calibration method 300 also facilitates reduction of EUT destruction and over design associated with testing failures resulting from excessive vibrations beyond prescribed parameters. In one exemplary implementation of the present invention, transient vibration time history testing calibration method 300 provides shaker instruction calibration adjustments that produce shaker drive signals that direct a shaker to shake the equipment under test in accordance with an acceleration time-history waveform.

In step 310 preliminary shaker instructions are loaded in a test controller (e.g., test controller 220). In one embodiment of the present invention, the preliminary shaker instructions are initial estimates of appropriate shaker instructions directed to producing a shaker drive signal that guides the shaking motion of a shaker (e.g., shaker 210) so that a piece of equipment under test (EUT) will move in accordance with a predetermined acceleration time-history waveform. In one exemplary implementation of the present invention, the estimates include calculations based upon information about the EUT such as size, weight, center of gravity, etc. In one exemplary implementation of the present invention the waveform is an acceleration time-history waveform VERTEQII (see FIG. 1A) as defined in Tellcordia GR-63-CORE Issue 1 October 1995 NEBS requirements for physical protection environmental tests.

In step 320, dummy load initial calibrated shaker instructions are produced. In one embodiment of the present invention, the dummy load initial calibrated shaker instructions are produced by a dummy load attenuated shaking process. In one exemplary implementation of the present invention, dummy load initial calibrated shaker instructions are produced by modifying the preliminary shaking instructions. Shaking forces are applied to a dummy load at a first attenuated value of the preliminary shaking instructions and the actual attenuated movements of the EUT are measured. In one embodiment of the present invention the first attenuated value is within the range of −2 dB to −5 dB (e.g., −3 dB). The dummy load is similar in mass and configuration to the equipment under test (EUT). The measured attenuated movements of the dummy load are utilized to determine if a projected full force test utilizing the preliminary instructions would produce a TRS within an acceptable range of an RRS. If the full force test utilizing the preliminary instructions are not projected to produce a TRS within an acceptable range of an RRS, dummy load initial shaker instruction adjustments calculated to produce a TRS within the RRS are made to the preliminary shaking instructions. A copy of the preliminary instructions with dummy load initial shaker instruction adjustments is utilized as the dummy load initial calibrated shaker instructions. In one embodiment of the present invention, step 320 is repeated a plurality of times (e.g., twice).

In step 330 dummy load final calibrated shaker instructions are provided. In one embodiment of the present invention, the dummy load final calibrated shaker instructions are provided by performing a dummy load full strength shaking process. In one exemplary implementation of the present invention a dummy load is shook at a full strength value of the dummy load initial calibrated shaker instructions. The actual time history movements of the dummy load are measured and a determination is made if the TRS is within an acceptable range of the RRS. If the TRS is not within an acceptable range, dummy load final shaker instruction adjustments calculated to bring the TRS within an acceptable range of the RRS are made to the dummy load initial calibrated shaker instructions. A copy of the dummy load initial instructions with dummy load final shaker instruction adjustments is utilized as the dummy load final calibrated shaker instructions.

In step 340 equipment under test (EUT) initial calibrated shaker instructions are produced. In one embodiment of the present invention, the equipment under test (EUT) initial calibrated shaker instructions are produced by performing an equipment under test (EUT) attenuated shaking process. In one exemplary implementation shaking forces are applied to the EUT at a second attenuated value of the dummy load final calibrated shaker instructions and the actual movements of the EUT are measured. In one embodiment of the present invention the second attenuated value is within the range of −2 dB to −5 dB (e.g., −3 dB). The measured attenuated movements of the EUT are utilized to determine if a projected full force test utilizing the dummy load final calibrated instructions would produce a TRS within an acceptable range of an RRS. If a full force test utilizing the dummy load final calibrated instructions are not projected to produce a TRS within an acceptable range of an RRS, EUT initial shaker instruction adjustments calculated to produce a TRS within the RRS are made to the dummy load final calibrated instructions. A copy of the dummy load final calibrated instructions with EUT initial shaker instruction adjustments is utilized as the EUT initial calibrated shaker instructions. In one embodiment of the present invention step 340 is repeated a plurality of times (e.g., twice).

To perform the full level test of the EUT, the EUT initial calibrated shaker instructions are applied to the EUT in step 350 and the actual final acceleration of the EUT is measured to ensure the TRS is within specified tolerances of the RRS. In one embodiment of the present invention, if the TRS is not within a specified range of the RRS then EUT final shaker instruction adjustments calculated to bring the TRS is within a specified range of the RRS are made to the EUT initial calibrated instructions and a full level test of the EUT is performed again. After the full level test the EUT is inspected for damage and functionality.

In one embodiment of the present invention the actual movement of the EUT is measured to ensure the TRS is within specified tolerances of the RRS. In one exemplary implementation the specified tolerances or ranges dictate that the TRS is above the RRS for frequencies at or above 1 Hz and no values are above by 30% or more between 1 Hz and 7 Hz. In another exemplary implementation of the present invention the TRS is kept above the RRS for frequencies at or above 1 Hz and no values are above by 2% or more between 1 Hz and 7 Hz.

In one embodiment of transient vibration time history testing calibration method 300, the TRS values are compared to RRS values and an algorithm provides instructions on necessary adjustments to the shaker instruction so that the forces the shaker applies to the EUT produce a TRS within acceptable ranges of the RRS. In one exemplary implementation of the present invention, appropriate amplification methods are applied in accordance with control software that includes the shaker instructions. For example, one algorithm includes a transfer function that relates the shaker table's input (e.g., in displacement) to the shaker table's output. In one exemplary implementation the transfer function is defined by dividing a shaker table's output by the input in the fast fourier transform (FFT) domain. The inverse of the transfer function is multiplied by the appropriate waveform in the FFT domain producing a first calibrated.

It is appreciated that the present invention is readily adaptable to a variety of appropriate calibration implementations. For example, in one embodiment of the present invention calibration adjustments are made directly to the shaker drive signal. In one embodiment of the present invention, calibration adjustments include physical changes to the mechanisms of the shaker (e.g., tightening or loosening components of the shaker).

FIG. 3B is a flow chart of dummy load attenuated shaking process 321, one embodiment of a dummy load attenuated shaking process utilized in step 320 of transient vibration time history testing calibration method 300. Dummy load attenuated shaking process 321 produces dummy load initial calibrated shaking instructions. In one exemplary implementation of the present invention two waveform tests are performed at a first attenuated value (e.g., −3 dB) and the measured results are utilized to produce dummy load initial calibrated shaking instructions.

In step 322 a dummy load is shook at a first attenuated value of preliminary shaker instructions. In one embodiment of the present invention the first attenuated value is within the range of −2 dB to −5 dB (e.g., 3 dB). In one exemplary implementation of the present invention the first attenuated value of preliminary shaker instructions is utilized to apply shaking forces a plurality of times (e.g. twice) to the dummy load.

In step 323 the actual acceleration time history movement of said dummy load is measured when shook at the attenuated value of the preliminary shaker instructions. In one exemplary implementation of the present invention, sensors (e.g., sensor 230) are utilized to measure the movement of the dummy load and TRS acceleration measurements are extrapolated from the distances moved in specific periods of time.

In step 324 an analysis is made if a dummy load full force test response spectrum (TRS) is projected to be within acceptable range of a required response spectrum (RRS) requirements. The analysis utilizes the measurements obtained in step 323 and projects the anticipated measurements if the preliminary shaker instructions were applied at full force. In one exemplary implementation of the present invention the TRS is required to be above the RRS for frequencies at or above 1 Hz and no values are above by 30% or more between 1 Hz and 7 Hz. In another exemplary implementation of the present invention the TRS is kept above the RRS for frequencies at or above 1 Hz and no values are above by 2% or more-between 1 Hz and 7 Hz.

In step 325 dummy load initial calibrated shaker instructions are produced. If a determination is made in step 324 that the dummy load full strength test response spectrum TRS is projected to be within acceptable range of said required response spectrum (RRS), the dummy load initial calibrated shaker instructions are a copy of the preliminary shaker instructions. If a determination is made in step 324 that the dummy load full strength test response spectrum TRS is not projected to be within an acceptable range of said required response spectrum (RRS), dummy load initial shaker instruction adjustments are made in the preliminary shaker instructions to produce the dummy load initial calibrated shaker instructions. The adjustments are calculated to bring a dummy load full strength test response spectrum (TRS) within acceptable range of said required response spectrum (RRS).

FIG. 3C is a flow chart of dummy load full strength shaking process 331 one embodiment of a dummy load full strength shaking process utilized in step 330 of transient vibration time history testing calibration method 300. Dummy load full strength shaking process 331 produces dummy load final calibrated shaking instructions. In one exemplary implementation of the present invention, the dummy load final calibrated shaking instructions are utilized in an EUT attenuated shaking process.

In step 332 a dummy load is shook at full strength value of the dummy load initial calibrated shaker instructions.

In step 333 the actual acceleration time history movement of the dummy load is measured when shook at the full strength value of the dummy load initial calibrated shaker instructions.

In step 334 a determination is made if the dummy load full strength test response spectrum TRS is within acceptable range of the required response spectrum (RRS). In one exemplary implementation of the present invention the TRS is required to be above the RRS for frequencies at or above 1 Hz and no values are above by 30% or more between 1 Hz and 7 Hz. In another exemplary implementation of the present invention the TRS is kept above the RRS for frequencies at or above 1 Hz and no values are above by 2% or more between 1 Hz and 7 Hz.

In step 335 dummy load final calibrated shaker instructions are produced. The dummy load final calibrated shaker instructions are instructions anticipated to bring a full strength EUT test response spectrum TRS within acceptable range of said required response spectrum (RRS). If a determination is made in step 334 that the dummy load full strength test response spectrum TRS is within acceptable range of said required response spectrum (RRS), the dummy load final calibrated shaker instructions are a copy of the dummy load initial calibrated shaker instructions. If a determination is made in step 334 that the dummy load full strength test response spectrum TRS is not within an acceptable range of said required response spectrum (RRS), adjustments in the dummy load initial calibrated shaker instructions are made to produce the dummy load final calibrated shaker instructions. The adjustments are calculated to bring an equipment under test full strength test response spectrum (TRS) within acceptable range of said required response spectrum (RRS).

Figure 3D:
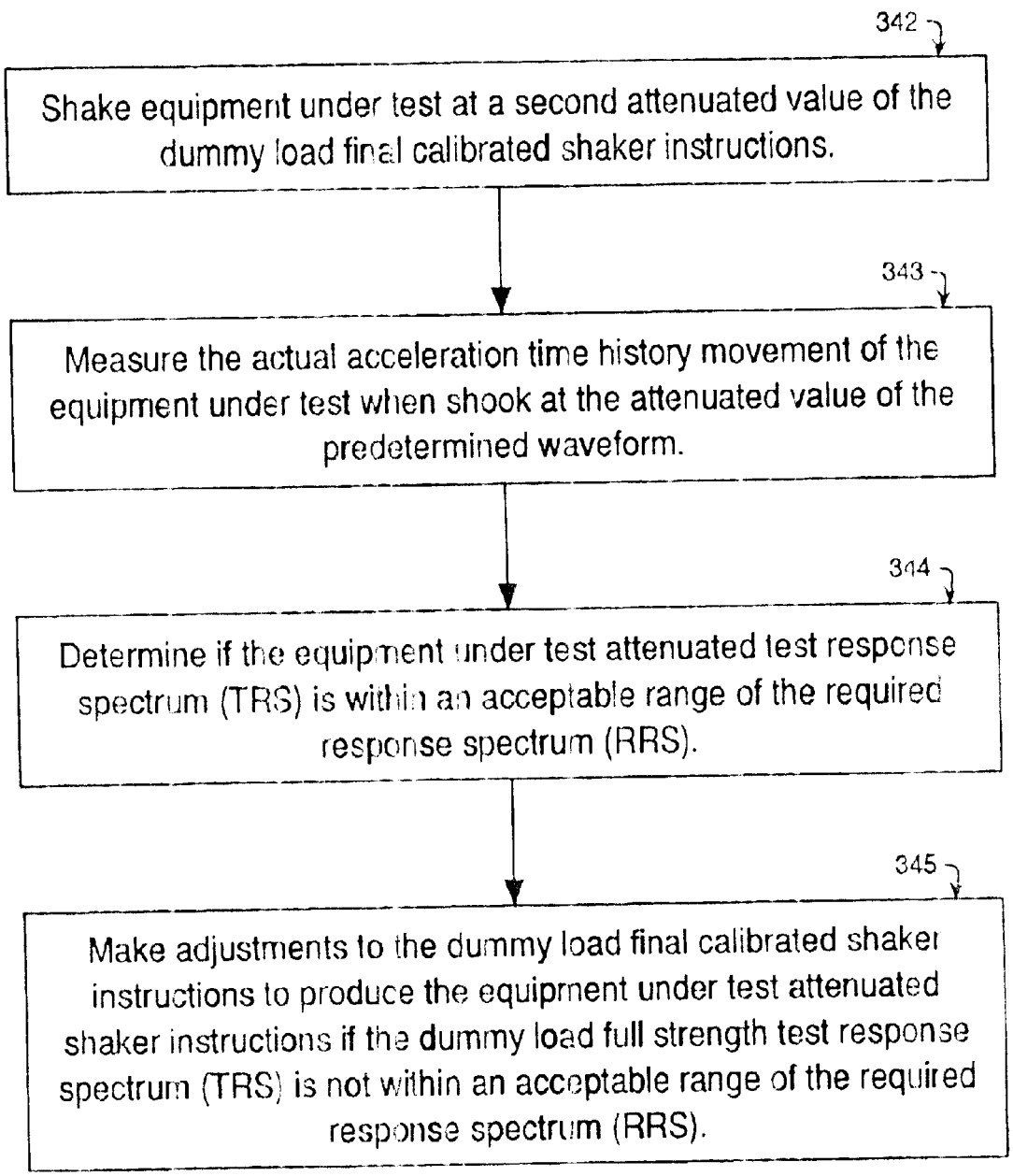
FIG. 3D is a flow chart of one embodiment of an equipment under test attenuated shaking process utilized in a present invention transient vibration time history testing calibration method.

FIG. 3D is a flow chart of equipment under test attenuated shaking process 341, one embodiment of an equipment under test attenuated shaking process utilized in step 340 of transient vibration time history testing calibration method 300. Equipment under test attenuated shaking process produces equipment under test initial calibrated shaking instructions. In one exemplary implementation of the present invention, the equipment under test initial calibrated shaking instructions are utilized in an EUT full strength shaking process.

In step 342 the EUT is shook at a second attenuated value of the dummy load final calibrated instructions. In one embodiment of the present invention the second attenuated value is within the range of −2 dB to −5 dB (e.g., −3 dB) of a predefined earthquake synthesized waveform. In one exemplary implementation of the present invention the second attenuated value of the dummy load final calibrated instructions are applied a plurality of times (e.g., twice) to the EUT.

In step 343 the actual acceleration time history movement of the EUT is measured when shook at the attenuated value of the dummy load final calibrated instructions. In one exemplary implementation of the present invention, sensors (e.g., sensor 230) are utilized to measure the movement of the EUT and TRS acceleration measurements are extrapolated from the distances moved in specific periods of time.

In step 344 an analysis is made if an EUT full force test response spectrum (TRS) is projected to be within acceptable range of a required response spectrum (RRS) requirements. The analysis utilizes the measurements obtained in step 343 and projects the anticipated measurements if the dummy load final calibrated instructions were applied at full force to the equipment under test (EUT). In one exemplary implementation of the present invention the TRS is required to be above the RRS for frequencies at or above 1 Hz and no values are above by 30% or more between 1 Hz and 7 Hz.

In step 345 EUT initial calibrated shaker instructions are produced. If a determination is made in step 344 that the EUT full strength test response spectrum TRS is projected to be within an acceptable range of said required response spectrum (RRS), the EUT initial calibrated shaker instructions are a copy of the dummy load final calibrated shaker instructions. If a determination is made in step 344 that the EUT full strength test response spectrum TRS is not projected to be within an acceptable range of said required response spectrum (RRS), adjustments are made in the dummy load final calibrated shaker instructions to produce the EUT initial calibrated shaker instructions. The adjustments are calculated to bring a EUT full strength test response spectrum (TRS) within acceptable range of said required response spectrum (RRS).

FIG. 3E is a flow chart of equipment under test full strength shaking process 451, one embodiment of an equipment under test full strength shaking process utilized in step 350 of transient vibration time history testing calibration method 300.

In step 352 Equipment under test is shook at a full strength value of said equipment under test initial calibrated shaker instructions.

In step 353 the actual acceleration time history movement of the equipment under test is measured when shook at the full strength value of the equipment under test initial calibrated shaker instructions. In one exemplary implementation of the present invention, sensors (e.g., sensor 230) are utilized to measure the movement of the dummy load and TRS acceleration measurements are extrapolated from the distances moved in specific periods of time.

In step 354 a determination is made if the test response spectrum TRS is within acceptable range of said required response spectrum (RRS) when a full force test is performed on the EUT. In one embodiment of the present invention, the TRS is measured when the EUT is shook at the full strength value of the equipment under test initial calibrated shaker instructions.

Figure 4:
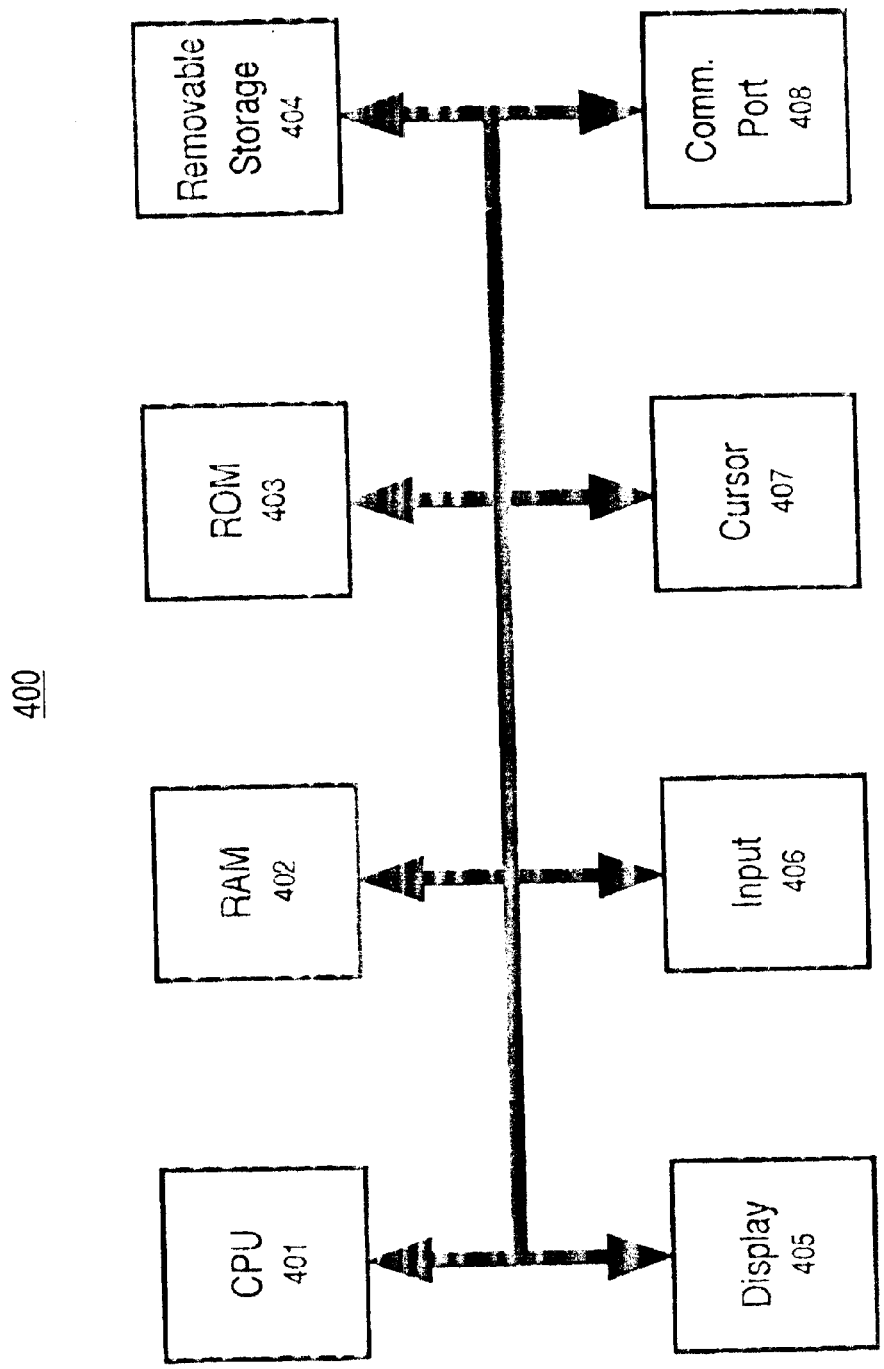
FIG. 4 is a block diagram of a computer system utilized in one embodiment of the present invention.

FIG. 4 is a block diagram of computer system 400, some of which is implemented in controller 220. Computer system 400 includes address/data bus 410, central processor 401, volatile memory 402 (e.g., random access memory RAM), non-volatile memory 403 (e.g., read only memory ROM), optional removable data storage device 404, display device 405, alphanumeric input device 406, cursor control or directing device 407, and signal communication port 408. Address/data bus 410 is coupled to central processor 401, volatile memory 402 (e.g., random access memory RAM), non-volatile memory 403 (e.g., read only memory ROM), display device 405, alphanumeric input device 406, cursor control or directing device 407, and signal communication port 408. The components of computer system 400 cooperatively function to provide a variety of functions. Address/data bus 410 communicates information, central processor 401 processes information and instructions, volatile memory 402 (e.g., random access memory RAM) stores information and instructions for the central processor 401 and non-volatile memory 403 (e.g., read only memory ROM) stores static information and instructions. Display device 405 displays information to the computer user and alphanumeric input device 406 and directing device 407 are input device. Communication port 408 is a communication interface for communicating signals to and from a coupled peripheral device (not shown).

Computer system 400 also comprises seismic testing software programs that include instructions of the performance of transient vibration time-history testing calibration methods and simulated time-history acceleration waveform testing of the present invention. Memory components of computer system 400 store present invention transient vibration time history testing calibration method information and instructions. In one exemplary implementation of the present invention, memory 402 also stores directions and information associated with transient vibration time-history testing processes including earthquake simulation and measurement processes. Processor 401 performs the present invention transient vibration time-history testing calibration method instructions and transient vibration time-history testing instructions. Computer system 400 stores the results (e.g., measurements of EUT movements) and determines if a TRS is within acceptable parameters of a RRS. In one exemplary implementation of the present invention, computer system 400 also utilizes the results to analyze the performance of the EUT under simulated earthquake conditions.

Figure 5:
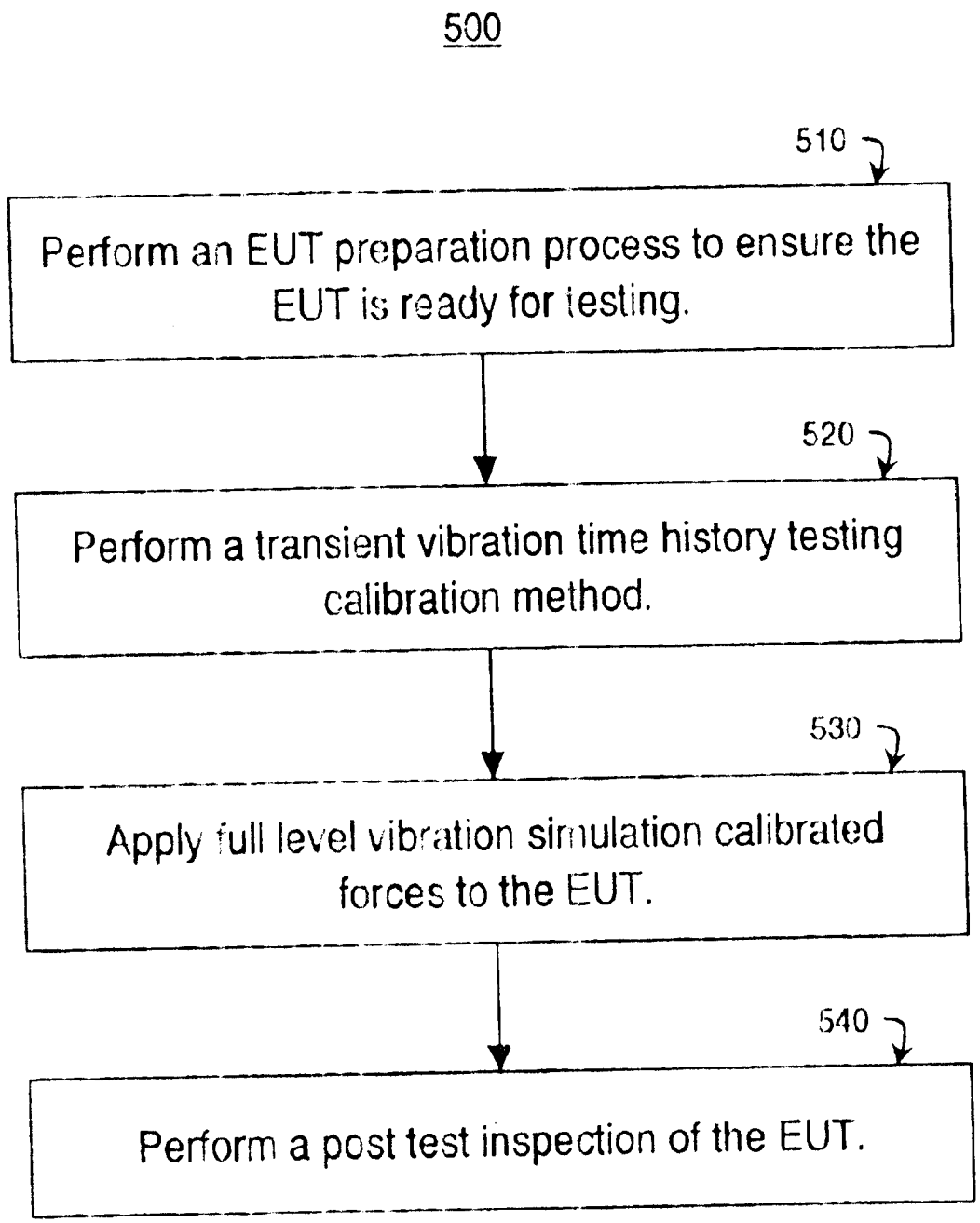
FIG. 5 is a flow chart of a electronic equipment transient vibration acceleration time history testing method, one embodiment of the present invention.

FIG. 5A is a flow chart of electronic equipment transient vibration acceleration time history-testing method 500, one embodiment of the present invention. Electronic equipment transient vibration acceleration time history testing method 500 facilitates efficient and effective calibration of vibration simulation systems to accurately reproduce predefined conditions during electronic equipment vibration survivability testing. It provides shaking force adjustments that produce equipment under test (EUT) accelerations tightly corresponding to a predefined waveform without the application of undue vibration to the EUT. Electronic equipment transient vibration acceleration time-history testing method 500 includes pre-test set up, calibration of testing equipment, acceleration time history testing of equipment, and post-test equipment survivability verification.

In step 510 an equipment under test (EUT) preparation process is performed to ensure the EUT is ready for testing. In one embodiment of the present invention, an EUT preparation process includes a testing level determination process, a pretest configuration process and a pretest inspection process. The testing level determination process analyses whether the EUT is tested at a framework level or a shelf level. The pretest configuration process arranges the EUT for testing. For example, the EUT is configured in compliance with a particular utilization (e.g. a known realistic configuration per the end-use installation). The pre-test inspection process determines the pre-test condition of the EUT. For example, the EUT is checked for structural or functional abnormalities or flaws before testing begins. In one exemplary implementation of the present invention, the EUT preparation process also includes an end use compensation process in which compensations are included for impacts from end use appenditures anticipated to be coupled to the EUT (e.g., overhead cables to other equipment in an end use environment).

In step 520 a transient vibration time-history testing calibration method is performed. In one exemplary implementation of the present invention, adjustments are made to forces applied to the EUT so that the acceleration of the EUT corresponds to a predetermined acceleration time history waveform (e.g., FIG. 1A). In one embodiment of the present invention, information associated with an acceleration time history waveform is loaded in a controller (e.g., controller 220) which produces shaker drive signals that control movements of a shaker (e.g., shaker 210). Two waveform tests are run at an attenuated value (e.g., −3 dB) of the shaker drive signals on a dummy load with a similar mass and configuration to the EUT. The acceleration of the dummy load is measured and adjustments are made to update the drive signals if the projected TRS for the EUT is not within acceptable tolerances of the RRS associated with the predetermined acceleration time history waveform. The adjustments are projected to provide shaker drive signals that shake the EUT within acceptable ranges of a RRS. Then a waveform test is run at full strength with the dummy load and the dummy load movements are measured. If the projected TRS for the equipment under test is not within acceptable tolerances of the RRS (e.g., the TRS is above the RRS for frequencies at or above 1 Hz and no values are more that 30% above prescribed RRS values between 1 and 7 Hz) further adjustments calculated to correct the problem are made to the shaker drive signals. In one exemplary implementation a swept sine survey is performed with an acceleration amplitude of 0.2 g from 1 to 50 Hz at a sweep rate of 1.0 octave per minute or higher. A waveform test is then performed on the EUT at an attenuated value and if the TRS is not projected to be within acceptable tolerances of an RRS for a full strength test, more adjustments are made to the shaker instruction. In one embodiment of the present invention, transient vibration time history testing calibration method 300 is utilized.

In step 530 full level vibration (e.g., earthquake) simulation calibrated forces are applied to the EUT in accordance with the results of the calibration method performed in step 520. In one embodiment of the present invention, a full-level earthquake synthesized waveform test is performed in accordance calibration results of step 520 directed at producing a predetermined waveform (e.g., see FIG. 1A). For example, the EUT is subjected to shaking forces in different directions conforming to specified waveforms by testing equipment calibrated in step 520 to produce earthquake simulations that accelerate the movement of the EUT within prescribed tolerances. In one exemplary implementation of the present invention, the full-level earthquake synthesized waveform test (e.g., the earthquake synthesized waveform VERTEQII) is performed. The resulting EUT acceleration movements are measured, recorded and analyzed. In one embodiment of the present invention the results are automatically measured by sensing equipment and recorded in a computer readable storage medium (e.g., memory 402 and 403). FIG. 7 is a table of the earthquake test parameters utilized in one exemplary implementation of the present invention. In one embodiment of the present invention a computer automatically analyzes if the TRS is within acceptable predetermined levels of the RRS. If the TRS is within acceptable predetermined levels of the RRS the computer automatically indicates a valid test procedure. If the TRS is not within acceptable predetermined levels of the RRS the computer automatically indicates an invalid test procedure.

In step 540 a post test inspection is performed on the EUT. In one embodiment of the present invention, a post-test structural evaluation of the EUT and a post test functional evaluation of the EUT are performed. The post test structural evaluation determines if the EUT displays any structural anomalies that violate testing criteria or otherwise may provide inaccurate test results. The post test functional evaluation ensures the equipment is still capable of functioning properly.

Figure 6:
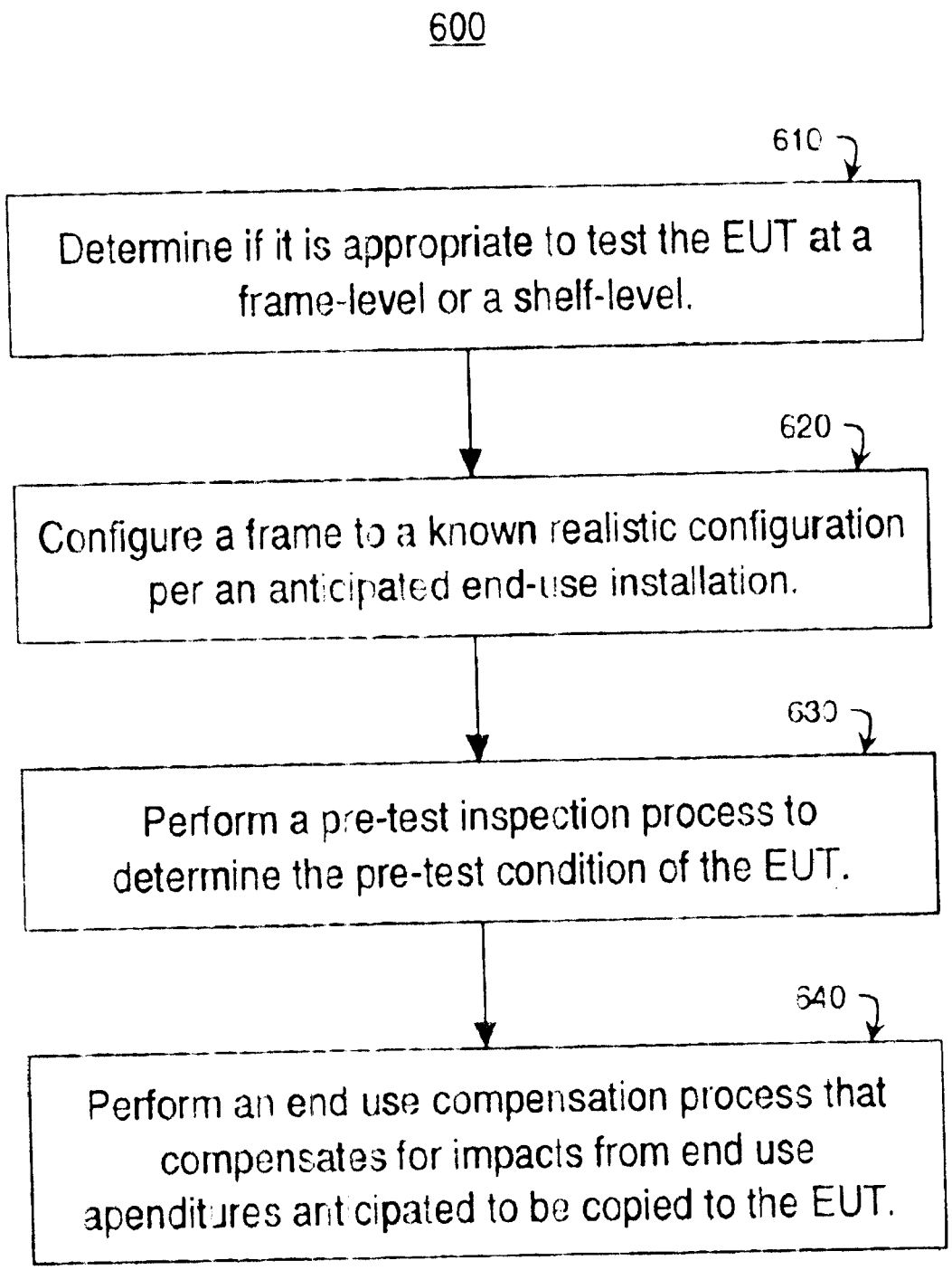
FIG. 6 is a flow chart of one embodiment of an EUT preparation process implemented in a present invention electronic equipment transient vibration acceleration time history testing method.

FIG. 6 is a flow chart of equipment under test (EUT) preparation process 600, one embodiment of an EUT preparation process implemented in step 510 of electronic equipment transient vibration acceleration time history testing method 500. Equipment under test (EUT) preparation process 600 determines if the EUT is ready for testing by analyzing the structural and functional features of the EUT. For example, a determination is made if pre-test structural anomalies exist that violate testing criteria or otherwise may provide inaccurate test results. If the equipment has structural damage or is not functioning properly before the test it will result in a potentially false indication that the simulated seismic forces caused the failure.

In step 610, a determination is made whether it is appropriate to test the equipment at a frame-level or shelf-level. An EUT is determined to be a "frame" if it has multiple shelves that contain subassemblies that make up a complete system and weighs approximately 435 lbs or more including the framework, electronics and overhead cable simulation weights. In one exemplary implementation of the present invention, a determination is made if the EUT meet the GR-63 requirements and objectives that apply to frame level testing (e.g., R4-44, R4-45, R4-46, 04-47, R4-48, and 04-49). An EUT is determined to be a "shelf" if it is a single item to be mounted on a shelf into an existing framework. The remaining space is populated with weights such that the entire frame with the EUT at the top of the frame is equal to approximately 435 lbs (including the cable simulation weights) and the vertical center of gravity is at the midpoint height of the frame. In one embodiment of the present invention, a determination is made if the EUT meets the GR-63 requirements and objectives that apply to shelf-level testing (e.g., R4-44, R4-48, and 04-49).

In step 620 the frame is configured to a known realistic configuration per an anticipated end-use installation. Installation hardware is included as part of the EUT specimen, including mounting hardware to the shaker table (such as shims under the frame, hold-down plates, etc.) electrical isolation bushings, panels, covers, doors, or other end-use installation hardware. The configuration comprises required components for functionality including electronic subassemblies (e.g., electronic subassemblies that ship to a customer for installation in the frame) and cabling for the EUT dressed per end-use installation. In one exemplary implementation of the present invention, specific enhancements to the GR63 specification requirements are included based upon a known detailed hardware configuration that will make the actual testing more realistic than generalized GR63 tests. For example, configuration details include the type, number, location and the torque value of fasteners used to bolt the EUT to frame and/or brackets. The fasteners to the shaker table are configured in accordance with the type, number, and torque of the fasteners anticipated to be utilized in the end-use installation. The center of gravity measurement for EUT total frame system weight is calculated and appropriate weights are distributed to reach 435 lbs for upright flange-type framework. In one embodiment of the present invention, the information associated with a known realistic configuration per an anticipated end-use installation is included in an equipment under test specific test assessment plan (TAP) that includes equipment specific setup instructions.

In step 630, a pre-test inspection process is performed to determine the pre-test condition of the EUT. The pre-test inspection process includes a pretest structural evaluation and a pretest functional evaluation. The pre-test structural evaluation determines if the EUT displays any pre-test structural anomalies that violate testing criteria or otherwise may provide inaccurate test results. The pretest functional evaluation ensures the equipment is functioning properly. If the equipment has structural damage or is not functioning properly before the test it will result in a potentially false indication that the simulated seismic forces caused the failure. In one exemplary implementation of the present invention, the EUT is visually inspected for any structural anomalies to establish pre-test structural condition of the EUT. The EUT is operated and functional tests are performed using software or diagnostics for proper execution of functional operations for a prescribed amount of time. In one embodiment of the present invention, key components of the EUT and the EUT as part of the testing system (e.g., including the shaker) are photographed for pre-test documentation. A variety of photographs are taken including each orientation for the test, mounting, weights, fixturing, and cable routing. EUT identification information is recorded. In one embodiment of the present invention, identification information includes description of EUT parts including part number and serial numbers of components (e.g., frame model number, frame manufacturer, serial numbers of printed circuit boards, power supplies, and subassemblies).

In step 640 an end use compensation process is performed that compensates for impacts from end use appenditures anticipate to be coupled to the EUT (e.g., overhead cables to other equipment in an end use environment). In one embodiment of the present invention the top of rack cable weight simulation is determined in which the acceptable range of weights to simulate the weight of cables running over the top of a frame is 18 kg to 45 kg. In one exemplary implementation of equipment under test (EUT) preparation process 600 a six inch slack cable loop density is provided for estimating the weight of cables running over the top of the frame (e.g., in order to apply a top of rack weight to the test item). If a weight is used that is less than 45 kg, justification for weight chosen to represent overhead cabling is provided including calculations to support the contention that the cables planned to run above the frame for this system have a specific weight density that justifies the top of rack weight used. In one implementation, a description is provided of all cabling that passes over the framework and cabling runs to adjacent equipment and is supported by the framework.

Figure 8:
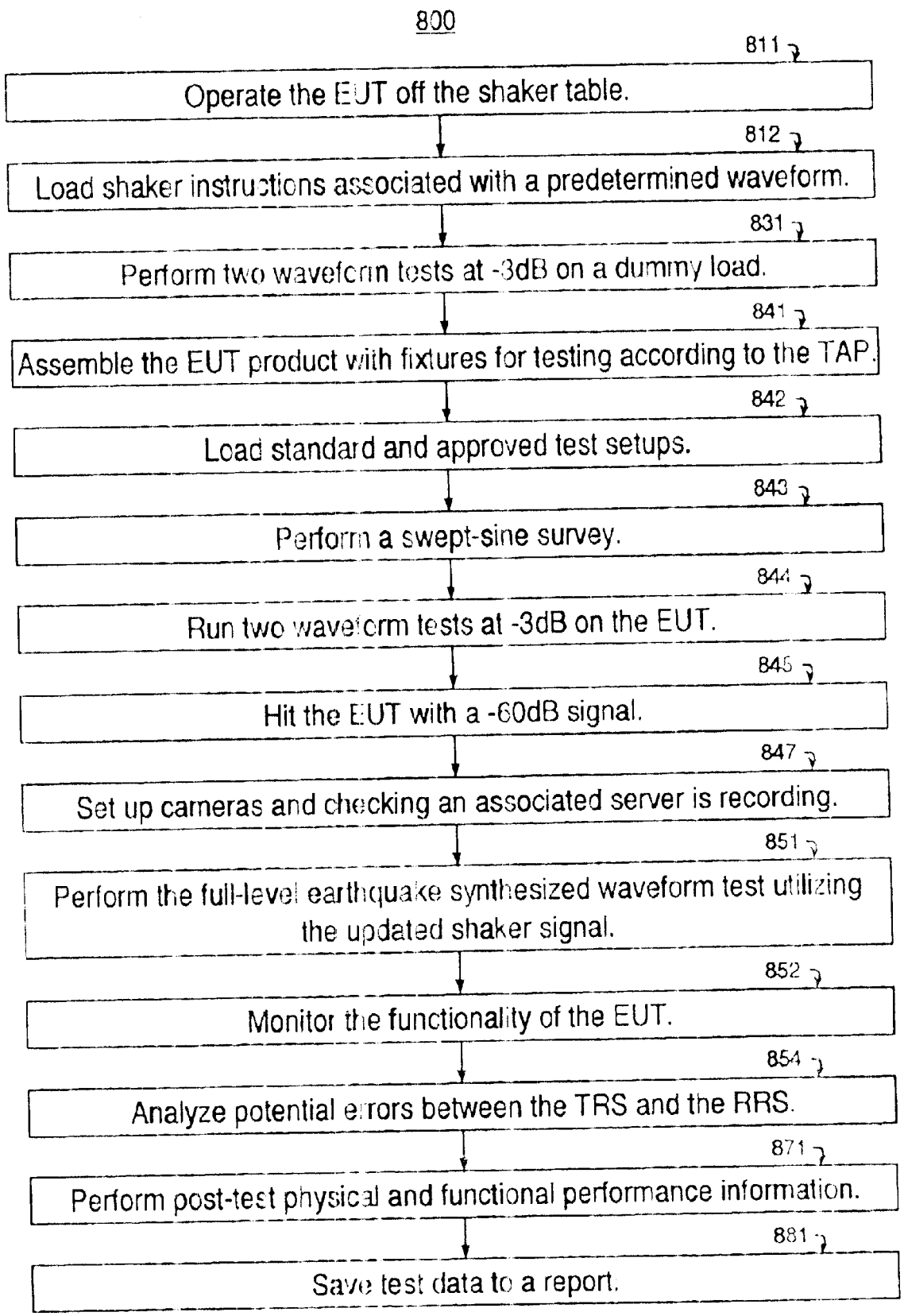
FIG. 8 is a flow chart of one embodiment of a present invention earthquake survivability testing method.

FIG. 8 is a flow chart of earthquake survivability testing method 800 one embodiment of the invention. Earthquake survivability testing method 800 facilitates calibration of testing equipment to ensure predefined acceleration time history waveforms are reproduced within acceptable parameters. The calibration assists testing equipment to perform in accordance with standard earthquake survivability testing requirements such as conforming to Telcordia (Bellcore) GR-63 criteria. For example, earthquake survivability testing method 800 conforms with the GR-63-CORE Issue 1, October 1995 requirements R4-44, R4-45, R4-46, 04-47, R4-48, R4-49 without undue stress and over testing of the EUT.

In step 811 the EUT is operated off the vibration table using appropriate software or diagnostics at standard reference conditions. In one exemplary implementation of the present invention, the EUT is operated long enough to establish pre-test functional performance is compliant with operational expectations for the EUT. In one embodiment of the present invention the pre-test functional performance information is recorded and documented.

In step 812 shaker instructions associated with a predetermined acceleration time-history waveform are loaded. In one exemplary implementation the shaker instructions comprise "pre-stored" earthquake shaker drive pulse information (e.g., in memory 402). In one embodiment of the present invention the shaker instructions are preliminary shaker instructions and the creation of the preliminary shaker instructions includes performing vibration table equalization for a new rack frame, new weight, or different center of gravity by equalizing the table with a regulated specimen for equalization without the EUT and associated framework. In one embodiment of the present invention, earthquake drive pulse information for frameworks, frame types, and frame weights previously analyzed and tested per this test procedure is available and utilized as the "pre-stored" earthquake drive pulse information.

In Step 831 two waveform tests are run at −3 dB on a dummy load with a similar mass and configuration to the EUT. Information retrieved (e.g., time history acceleration measurements) from waveform tests run at −3 dB on the dummy load is utilized to update the shaker drive pulse information. In one embodiment of the present invention dummy load initial calibrated shaker instructions are created. Then waveform tests are run at 0 dB of the predetermined waveform on the dummy load with application of appropriate amplification methods (e.g., depending upon the control software used) to ensure the TRS is above the RRS for frequencies at or above 1 Hz. In one embodiment of the present invention appropriate amplification methods are utilized to make additional updates to the shaker drive pulse information. The updates are calculated to ensure no values of the TRS are above the RRS by more than 30% between 1 and 7 Hz. In one embodiment of the present invention, appropriate amplification methods are utilized to ensure values of the TRS are not above the RRS by more than 5% between 1 and 7 Hz. In one exemplary implementation dummy load final calibrated shaker instructions are produced.

In step 841 the EUT product is assembled with appropriate fixtures for testing per the product specific test assessment plan (TAP). The TAP describes how to install, configure and execute appropriate software and/or diagnostics. The TAP also provides details on configuring the frame. In one exemplary implementation of the present invention the TAP provides configuration information on a known realistic configuration for end-use installation including installation hardware (e.g., mounting hardware to the shaker table, shims under the frame if physical check of the frame shows rocking on the adapter plate, hold-down plates, electrical isolation bushings, panels, covers, doors, or other end-use installation hardware). The TAP also includes information on minimum configuration components required for functionality including electronic subassemblies (e.g., electronic subassemblies that ship to a customer for installation in the frame, cabling from the EUT dressed per end-use installation, etc.). In one exemplary implementation of the present invention, specific enhancements to the GR63 specification are included based upon a known detailed hardware configuration that will make the actual testing more realistic than generalized GR63 tests. The configuration details include the type, number, location and the torque value of fasteners used to bolt EUT to frame and/or brackets.

In step 842 standard and approved test setups are loaded for the test equipment controller. Loading of the setups is verified and the control program used for the test is documented.

A swept-sine survey of 0.2 g's from 1 to 50 Hz at 1.0 octave/minute is performed in step 843. Acceleration responses of the framework top and mid-point are recorded. The product response adjacent to the framework accelerometer is also recorded for analysis of amplification from the frame to the product and mounting bracket effects.

In step 844 sensors (e.g., lasers) are coupled to the testing system, instrumentation output of data channels is verified, updated shaker drive pulse information is loaded and 2 waveform tests at −3 dB are run on the EUT. Information retrieved (e.g., time history acceleration measurements) from waveform tests run at −3 dB on the EUT is utilized to calculate additional updates to the shaker drive pulse information. In one embodiment of the present invention EUT initial calibrated instructions are created.

In step 845 the EUT (e.g., real product) is hit with −60 dB signal. In one embodiment of the present invention there is no updating the pre-stored drive pulse waveform information after the −60 dB test run. In one exemplary implementation of the present invention, laser data, accelerometers, table function and servo valve are verified for accuracy. Hitting the EUT with a 60 dB signal also permits operators to ensure the test setup is ready for full-level testing of the real product.

In step 847 appropriate camera views are setup up and an associated digital server is checked to ensure it is recording. In one exemplary implementation of the present invention, two camera views that capture the best observation of critical EUT components (e.g., components intended to provide environmental protection for the EUT) are selected. In one embodiment of the present invention the cameras include audio capabilities and the date, product name, test engineer, report #, and test axis are stated into the microphone of a designated main camera.

In step 851 the full-level earthquake synthesized waveform test is performed utilizing the updated shaker drive pulse signal information. In one embodiment of the present invention the EUT initial calibrated shaker instructions are utilized to perform the full-level earthquake synthesized waveform test.

In step 852 the software and diagnostic functionality of the EUT are monitored. In one embodiment of the present invention, functional performance information association with the operation of the EUT is documented during the test and utilized to determine if the product functioned properly (e.g., there are no software errors) throughout the waveform testing. This functional performance information is used to evaluate if the EUT met testing objectives (e.g., function without software errors). FIG. 9 is a table showing testing objectives in one embodiment of the present invention. The EUT is also checked at the completion of the waveform test to ensure it is still functioning. In one embodiment of the present invention, if the EUT is not functioning a notation is made of how much time elapses before the system returns to proper functionality without any intervention.

In step 854 potential errors between the TRS and the RRS are analyzed. In one embodiment of the present invention, TRS results are analyzed to ensure the TRS meets or exceeds the RRS at all frequencies and that the TRS does not exceed the RRS by more than 30% between 1 and 7 Hz.

In step 871 the post-test physical and functional performance inspection are performed comparing key areas to the notes and photographs taken before the test and recorded observations in the test report.

In step 881 test data is saved as a test report. In one exemplary implementation of the present invention, the earthquake test data is saved to a report file and TRS vs. the RRS information (e.g., in graph or textual form) is printed. In one exemplary implementation of the present invention, test data includes relative displacement data (rack top minus rack bottom versus time) for the x and y axis, TRS information, acceleration data from the top of the frame, peak load cell data if taken and the post-test torque value of the fasteners. The functionality data from the product is saved to the test report. Still images of the fixturing, frame mounting, EUT product mounting, weight distribution, and orientation of the framework and product to the test table are saved into the test report. A digital video with time-stamped frames of the framework earthquake synthesized waveform test are saved to the test report. Memory is checked to ensure obtained data has been saved. In one embodiment of the present invention, obtained data is saved per prescribed reporting requirements and the Earthquake Test Data Sheet shown in FIG. 10.

In one embodiment of earthquake survivability testing method 800 a Z-axis (e.g., a vertical axis test) is performed first. Then steps 3 through 20 are repeated for a Y-axis (e.g., front-to-back) and then an X axis (e.g., side-to-side).

Thus, the present invention is a system and method that facilitates earthquake testing adjustments directed at assisting consistent, accurate, and efficient earthquake survivability testing for communications networking equipment with minimal calibration shaking. The present invention transient vibration time history testing calibration system and method facilitates efficient and effective calibration of vibration simulation systems to accurately reproduce predefined conditions during electronic equipment vibration survivability testing. The transient vibration time history testing calibration system and method provides shaking force adjustments that produce equipment under test (EUT) accelerations tightly corresponding to a predefined waveform without the application of undue vibration to the EUT. The transient vibration time history testing calibration method facilitates reduction of equipment destruction and over design of equipment associated with false testing failures corresponding to excessive vibrations beyond prescribed parameters.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to a particular use contemplated. It is intended that the scope of the invention be defined by the claims appended hereto and their equivalents.

What is claimed is:

1. A transient vibration time-history testing calibration method comprising the steps of:

loading preliminary shaker instructions corresponding to a predetermined acceleration time history waveform;

producing dummy load initial calibrated shaker instructions by a dummy load attenuated shaking process in which shaking forces are applied to a dummy load at a first attenuated value of said preliminary shaker instructions;

providing dummy load final calibrated shaker instructions by performing a dummy load full strength shaking process in which shaking forces are applied to said dummy load at a full force value of said dummy load initial calibrated shaker instructions;

producing equipment under test (EUT) initial calibrated shaker instructions by performing an equipment under test (EUT) attenuated shaking process in which shaking forces are applied to equipment under test (EUT) at a second attenuated value of said dummy load final calibrated shaker instructions; and performing a full force waveform test on said equipment under test (EUT) utilizing said equipment under test (EUT) initial calibrated shaker instructions.

2. The transient vibration time-history testing calibration method of claim 1 wherein said dummy load attenuated shaking process comprises the steps of:

shaking a dummy load at a first attenuated value of said preliminary shaker instructions;

measuring the actual acceleration time-history movement of said dummy load when shook at said attenuated value of said preliminary shaker instructions;

analyzing if said test response spectrum (TRS) is projected to be within a predetermined acceptable range of a required response spectrum (RRS);

utilizing a copy of said preliminary shaker instructions as said dummy load initial calibrated shaker instructions if said test response spectrum (TRS) is projected to be within an predetermined acceptable range of a required response spectrum (RRS); and making adjustments in said preliminary shaker instructions to produce said dummy load initial calibrated shaker instructions if said test response spectrum (TRS) is not projected to be within an predetermined acceptable range of a required response spectrum (RRS), said adjustments calculated to bring a said full strength test response spectrum (TRS) within an predetermined acceptable range of said required response spectrum (RRS).

3. The transient vibration time-history testing calibration method of claim 1 wherein said dummy load full strength shaking process comprises the steps of:

shaking a dummy load at full strength value of said dummy load initial calibrated shaker instructions;

measuring the actual acceleration time-history movement of said dummy load when shook at said full strength value of said dummy load initial calibrated shaker instructions;

determining if said test response spectrum (TRS) is within a predetermined acceptable range of said required response spectrum (RRS);

making adjustments in said dummy load initial calibrated shaker instructions to produce said dummy load final calibrated shaker instructions if said dummy load full strength test response spectrum TRS is not within a predetermined acceptable range of said required response spectrum (RRS) requirements, said adjustments calculated to bring a equipment under test full strength test response spectrum (TRS) within a predetermined acceptable range of said required response spectrum (RRS); and utilizing a copy of said dummy load initial calibrated shaker instructions as said dummy load final calibrated shaker instructions if said dummy load full strength test response spectrum TRS is within an predetermined acceptable range of said required response spectrum (RRS) requirements.

4. The transient vibration time-history testing calibration method of claim 1 wherein said equipment under test attenuated shaking process comprises the steps of:

shaking equipment under test at a second attenuated value of said dummy load final calibrated shaker instructions;

measuring the actual acceleration time-history movement of said equipment under test when shook at said attenuated value of said dummy load final calibrated shaker instructions;

analyzing if said test response spectrum (TRS) is within an predetermined acceptable range of said required response spectrum (RRS) requirements;

making adjustments in said dummy load final calibrated shaker instructions to produce said equipment under test attenuated shaker instructions if said dummy load full strength test response spectrum TRS is not within a predetermined acceptable range of said required response spectrum (RRS), said adjustments calculated to bring an equipment under test full strength test response spectrum (TRS) within an predetermined acceptable range of said required response spectrum (RRS); and utilizing said dummy load final calibrated shaker instructions as said equipment under test attenuated calibrated shaker instructions if said equipment under test attenuated strength test response spectrum TRS is within an predetermined acceptable range of said required response spectrum (RRS) requirements.

5. The transient vibration time-history testing calibration method of claim 1 wherein said equipment under test full strength process comprises the steps of:

shaking equipment under test at a full strength value of said equipment under test final calibrated shaker instructions;

measuring the actual acceleration time history movement of said equipment under test when shook at said full strength value of said predetermined waveform; and determining if said equipment under test attenuated test response spectrum TRS is within a predetermined acceptable range of said required response spectrum (RRS) requirements.

6. The transient vibration time-history testing calibration method of claim 1 wherein said predetermined acceleration time history waveform is an acceleration-time history waveform VERTEQII as defined in Tellcordia GR-63-CORE Issue 1 October 1995 Network Equipment-Building System (NEBS) requirements for physical protection environmental tests.

7. The transient vibration time-history testing calibration method of claim 1 wherein said first and said second attenuated values are between 2 dB and −5 dB.

8. The transient vibration time-history testing calibration method of claim 1 wherein said first and said second attenuated values are −3 dB.

9. The transient vibration time-history testing calibration method of claim 1 wherein said predetermined range is said test response spectrum (TRS) above said required response spectrum (RRS) for frequencies at or above 1 Hz and no values are above by 30% or more between 1 Hz and 7 Hz.

10. The transient vibration time-history testing calibration method of claim 1 wherein said predetermined range is said test response spectrum (TRS) above said required response spectrum (RRS) for frequencies at or above 1 Hz and no values are above by 5% or more between 1 Hz and 7 Hz.

11. A transient vibration acceleration time-history testing method comprising the steps of:

performing an equipment under test (EUT) preparation process to ensure equipment under test (EUT) is ready for testing, wherein said equipment under test (EUT) preparation process includes:

performing a testing level determination process that analyzes whether said equipment under test (EUT) is tested at a framework level or a shelf level;

performing a pretest configuration process that arranges said equipment under test (EUT) for testing in compliance with a particular utilization per an end-use installation; and performing a pre-test inspection process that determines the pre-test condition of said equipment under test (EUT) including checking for structural and functional abnormalities or flaws before testing begins;

performing a transient vibration time history testing calibration method;

applying full level vibration simulation calibrated forces to said equipment under test (EUT) in accordance with the results of said calibration method; and performing a post test inspection on said equipment under test (EUT).

12. A transient vibration acceleration time-history testing method of claim 11 further comprising the steps of:

loading information associated with a predetermined acceleration time history waveform in a controller which produces shaker drive signals that control movements of a shaker;

running two waveform tests at a first attenuated value of said shaker drive signals on a dummy load with a similar mass and configuration to said equipment under test (EUT);

measuring the movements and acceleration of said dummy load;

making adjustments to update said drive signals if a projected test response spectrum (TRS) for the equipment under test is not within acceptable predetermined tolerances of a required response spectrum (RRS), said adjustments are projected to provide shaker drive signals that shake the equipment under test (EUT) within acceptable predetermined ranges of said required response spectrum (RRS);

running a waveform test at full strength on the dummy load and measuring movements of said dummy load making additional adjustments in said shaker drive signals if said projected test response spectrum (TRS) for said equipment under test is still not within acceptable predetermined tolerances of said required response spectrum (RRS);

performing a waveform test on said equipment under test at a second attenuated value and measuring the movements of said equipment under test; and making further adjustments in said shaker drive signals if said projected test response spectrum (TRS) for said equipment under test is still not within acceptable predetermined tolerances of said required response spectrum (RRS).

13. The transient vibration acceleration time-history testing method of claim 12 wherein said first attenuated value and said second attenuated value are −3 dB.

14. The transient vibration acceleration time-history testing method of claim 12 wherein said acceptable predetermined tolerances is a test response spectrum (TRS) above the required response spectrum (RRS) for frequencies at or above 1 Hz and no values are more that 30% above said required response spectrum (RRS) values between 1 and 7 Hz.

15. The transient vibration acceleration time-history testing method of claim 12 wherein said predetermined acceleration time history waveform is an acceleration-time history waveform VERTEQII as defined in Telcordia GR-63-CORE Issue 1 October 1995 Network Equipment-Building System (NEBS) requirements for physical protection environmental tests.

16. The transient vibration acceleration time-history testing method of claim 12 wherein aid first attenuated value and said second attenuated value are between −2 dB and −5 dB.

17. An earthquake survivability testing method comprising the steps of:

loading shaker instructions including pre-stored drive pulse information;

running waveform tests on a dummy load including two waveform tests at a first attenuated value of said shaker instructions and making calibration adjustments to said shaker instructions, said calibration adjustments providing updated shaker instructions calculated to bring a measured test response spectrum (TRS) within an acceptable predetermined range of a required response spectrum (RRS);

running waveform tests on equipment under test including two waveform tests at a second attenuated value of said updated shaker instructions and making additional calibration adjustments to said updated shaker instructions, said additional calibration adjustments providing final calibrated shaker instructions calculated to bring a measured test response spectrum (TRS) within an acceptable predetermined range of a required response spectrum (RRS); and performing a full level earthquake synthesized waveform test utilizing said final calibrated shaker instructions.

18. The earthquake survivability testing method of claim 17 further comprising the step of hitting said equipment under test (EUT) with a −60 dB shaker driver signal based upon said final calibrated shaker instructions.

19. The earthquake survivability testing method of claim 17 further comprising the steps of:

operating said equipment under test (EUT) off a vibration table using appropriate software or diagnostics at standard reference conditions;

assembling said equipment under test (EUT) with appropriate fixtures for testing per the product specific test assessment plan (TAP);

loading standard and approved test setups for a test equipment controller and loading of said standard and approved test setups is verified; and performing a swept-sine survey of 0.2 g's from 1 to 50 Hz at 1.0 octave/minute and recording acceleration responses of the framework top and mid-point.

20. The earthquake survivability testing method of claim 17 further comprising the steps of:

setting up appropriate camera views that capture the best observation of critical equipment under test (EUT) components and an associated digital server is checked to ensure it is recording;

monitoring the software and diagnostic functionality of the equipment under test (EUT)

analyzing potential errors between said test response spectrum (TRS) and said required response spectrum (RRS)

saving test data as a test report file.

21. The earthquake survivability testing method of claim 20 further comprising wherein said test report includes relative displacement data (rack top minus rack bottom versus time) for an x and y axis, test response spectrum (TRS) information, acceleration data from the top of the fame, peak load cell data if taken and the post-test torque value of the fasteners, functionality data from the equipment under test (EUT), digital video with time-stamped frames of the framework earthquake synthesized waveform, and information on observations of post-test physical and functional performance inspection.

22. The earthquake survivability testing method of claim 20 further comprising wherein said test report includes still images of the fixturing, frame mounting, equipment under test (EUT) mounting weight distribution, and orientation of the framework and product to a test table.

* * * * *